United States Patent [19]

Miller, III

[11] 4,359,675

[45] Nov. 16, 1982

[54] ELECTRICAL CONTROL SYSTEM AND METHOD FOR A TIRE BUILDING MACHINE SERVER

[75] Inventor: Nick M. Miller, III, Rootstown, Ohio

[73] Assignee: The Firestone Tire & Rubber Company, Akron, Ohio

[21] Appl. No.: 147,644

[22] Filed: May 7, 1980

[51] Int. Cl.³ .......................................... G05B 19/28
[52] U.S. Cl. .................................. 318/603; 318/490; 318/625; 318/640; 250/560; 425/29
[58] Field of Search .............. 318/603, 616, 625, 640, 318/490, 85, 39; 250/548, 560, 561, 557, 571; 242/186; 356/399, 400; 425/29; 198/345, 855, 858, 859

[56] References Cited

U.S. PATENT DOCUMENTS

| | | | |
|---|---|---|---|
| 3,653,770 | 4/1972 | Yamamuro | 250/560 |
| 3,766,459 | 10/1973 | McIntosh et al. | 318/603 |
| 4,006,395 | 2/1977 | Reesen | 318/640 |
| 4,020,406 | 4/1977 | Tokuno et al. | 318/603 |
| 4,203,064 | 5/1980 | Suzuki et al. | 318/640 |

Primary Examiner—David Smith, Jr.
Assistant Examiner—Eugene S. Indyk

[57] ABSTRACT

An electrical control system (31) for a tire building machine servicer (10) and method for controlling the position of a component material (13) emitted from the servicer (10) on a conveyor (12) includes an electrical guidance system (33) and an electrical drive tracking system (34). The electrical guidance system (33) includes two cameras (39, 40) providing pulse train output signals indicative of the position of the material edges relative to a fixed longitudinal axis (23), the number of pulses in which are counted in lateral position error counter (46) to provide an error correction signal to a conveyor position drive motor (30). The electrical drive tracking system (34) includes two encoders (81, 82) providing pulse train output signals indicative of the position of the component material (13) relative to the locus of points of an elastic material on a rotatable tire building drum (15). The encoder pulse train output signals are processed and counted in a tracking error counter (110) to provide a tracking error correction signal to a conveyor drive motor (19).

42 Claims, 5 Drawing Figures

ELECTRICAL CONTROL SYSTEM AND METHOD FOR A TIRE BUILDING MACHINE SERVER

TECHNICAL FIELD

The present invention relates generally to server units for a tire building machine. More particularly, the present invention concerns an electrical control system and method for servers utilized with a tire building machine. Still more particularly, the present invention relates to an electrical position guidance and drive tracking system and method for a server in use with a tire building machine having a headstock assembly which moves relative to a plurality of servers and which includes a rotatable tire drum.

BACKGROUND ART

Innumerable mechanical devices exist for furnishing component materials or subassemblies to other construction devices. Frequently the precise position of such component materials relative to that of the construction device is highly critical for a properly assembled finished product.

One area in which such a need occurs is that of tire building machines. Previously these machines included a stationary headstock assembly having a selectively rotatable drum upon which the tire components are assembled, and at least one "butterfly" server having a plurality of material feed conveyors each of which is selectively alignable with the drum. At least for the construction of radial tires, it is highly important to precisely and accurately align tire component materials because of the various mechanical properties of these tires.

In order to insure a continuous supply of component materials, each feed conveyor is normally serviced by a continuous roll of the respective material, which material must be cut to suitable length before or during application to the tire drum. The design of certain radial tires requires that one or more component materials be stretched and tensioned during assembly on the building drum, necessitating that appropriate allowances be made when cutting and/or applying these components. In order to provide sufficient green strength for the stretching and tensioning, these components can be partially cured.

Heretofore, adjustments for both alignment and material length on tire building machines were made manually or with a mechanical system, if made at all.

DISCLOSURE OF INVENTION

It is therefore, an object of the invention to provide an electrical control system for a tire building machine server and method for controlling the position of a component material emitted from the server.

It is another object of the invention to provide an electrical control system and method for a tire building machine server, as above, having an electrical guidance system for precisely and accurately aligning the various component materials emitted from the server.

It is still another object of the invention to provide an electrical control system and method for a tire building machine server, as above, wherein the electrical guidance system precisely and accurately aligns the various component materials from the server to a preselectable component material edge or center-line, as desired.

It is yet another object of the invention to provide an electrical control system and method for a tire building machine server, as above, wherein the electrical guidance system includes a circuit for determining the width of the component material and displays the same.

It is even another object of the invention to provide an electrical control system and method for a tire building machine server, as above, wherein the electrical guidance system employs a video camera providing a signal indicative of the lateral position of the component material on the server conveyor.

It is a further object of the invention to provide an electrical control system and method for a tire building machine server, as above, having an electrical drive tracking system for corollating the server material instantaneous feed position with the instantaneous rotational position of the building drum, allowing for stretching and tensioning that may or must occur during assembly and/or final curing.

It is still a further object of the invention to provide an electrical control system and method for a tire building machine server, as above, wherein the electrical drive tracking system employs encoders for determining the server material instantaneous feed position and the instantaneous circumferential position of the building drum, and further including a circuit for driving the server conveyor at a rate and for a time to permit a preselected stretch and/or tension in the desired component material.

These and other objects and advantages of the present invention over existing prior art forms will become more apparent and fully understood from the following description in conjunction with the accompanying drawings.

In general, a circuit for controlling the position of a material on a conveyor relative to a locus of points on the surface of a building drum having a drum rotation drive motor, the conveyor having both longitudinal and transverse reference axes, a conveyor position motor and conveyor drive motor, includes a first sensor for generating an output signal indicative of a position of the material relative to the transverse reference axis and the direction of any motion thereof, a second sensor for generating an output signal indicative of the position of the locus of points on the surface of the building drum and the direction of any rotation thereof, and a third sensor for generating a pulse train output signal having a number of pulses that is indicative of the position of the material relative to the longitudinal reference axis.

A ratio circuit receives the output signal from one of the first or second sensors and generates an output signal in a preselected proportion thereto. A tracking error correction circuit receives the output signal from the ratio circuit and provides an output signal to the conveyor drive motor whereby the conveyor drive motor maintains the desired position of the material relative to the transverse reference axis and the locus of points on the surface of the building drum. A position error counter circuit receives the pulse train output signal from the third sensor and counts from a preselected number for a count proportional to the number of pulses in the pulse train output signal, the final number in the position error counter circuit indicative of the necessary correction in the position of the material to maintain a preselected position relative to the longitudinal reference axis. A position error correction circuit receives the final number from the position error counter circuit and provides an output signal to the conveyor position drive motor whereby the necessary correction in the position of the material relative to the longitudinal reference axis is achieved.

A method for controlling the position of a material on a conveyor relative to a locus of points on the surface of a building drum having a drum rotation drive motor, the conveyor having both longitudinal and transverse reference axes, a conveyor position drive motor and conveyor drive motor, includes the steps of generating a first output signal indicative of a position of the material relative to the transverse reference axis and the direction of any motion thereof, generating a second output signal indicative of the position of the locus of points on the surface of the building drum and the direction of any rotation thereof, and generating a pulse train output signal having a number of pulses that is indicative of the position of the material relative to the longitudinal reference axis.

The method includes multiplying one of the first or the second output signals by a preselected ratio, and providing an output signal in proportion to the multiplied output signal to the conveyor drive motor whereby the conveyor drive motor maintains the desired position of the material relative to the transverse reference axis and the locus of points on the surface of the building drum. Counting is performed in a first counter from a first preselected number for a count proportional to the number of pulses in the pulse train output signal to a final number indicative of the necessary correction in the position of the material to maintain a preselected position relative to the longitudinal reference axis, and an output signal proportional to the final number is generated for receipt by the conveyor position drive motor whereby the necessary correction in the position of the material relative to the longitudinal reference axis is achieved.

PREFERRED EMBODIMENT FOR CARRYING OUT THE INVENTION

Figure 1:
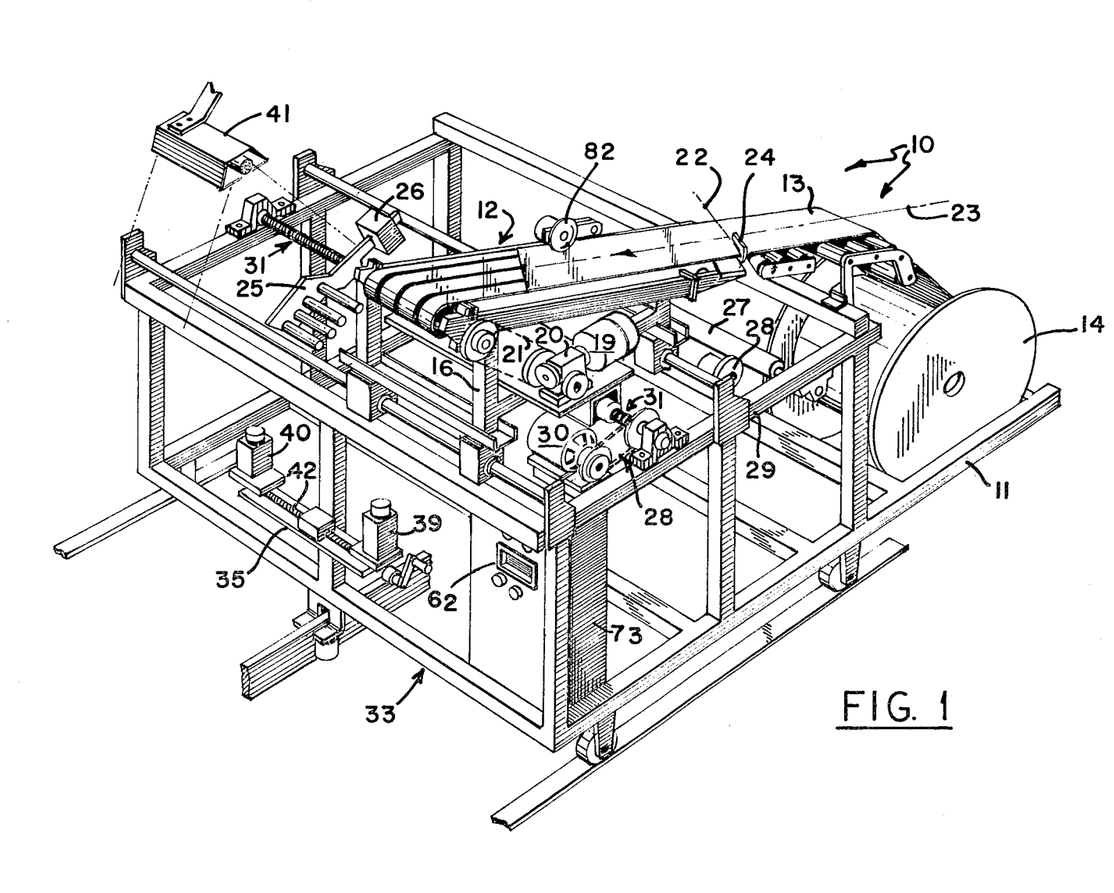
FIG. 1 is a perspective view of a server for a tire building machine with which the present invention is suitable for use, showing in particular aspects of an electrical guidance system and embodied method for the conveyor.
Figure 2:
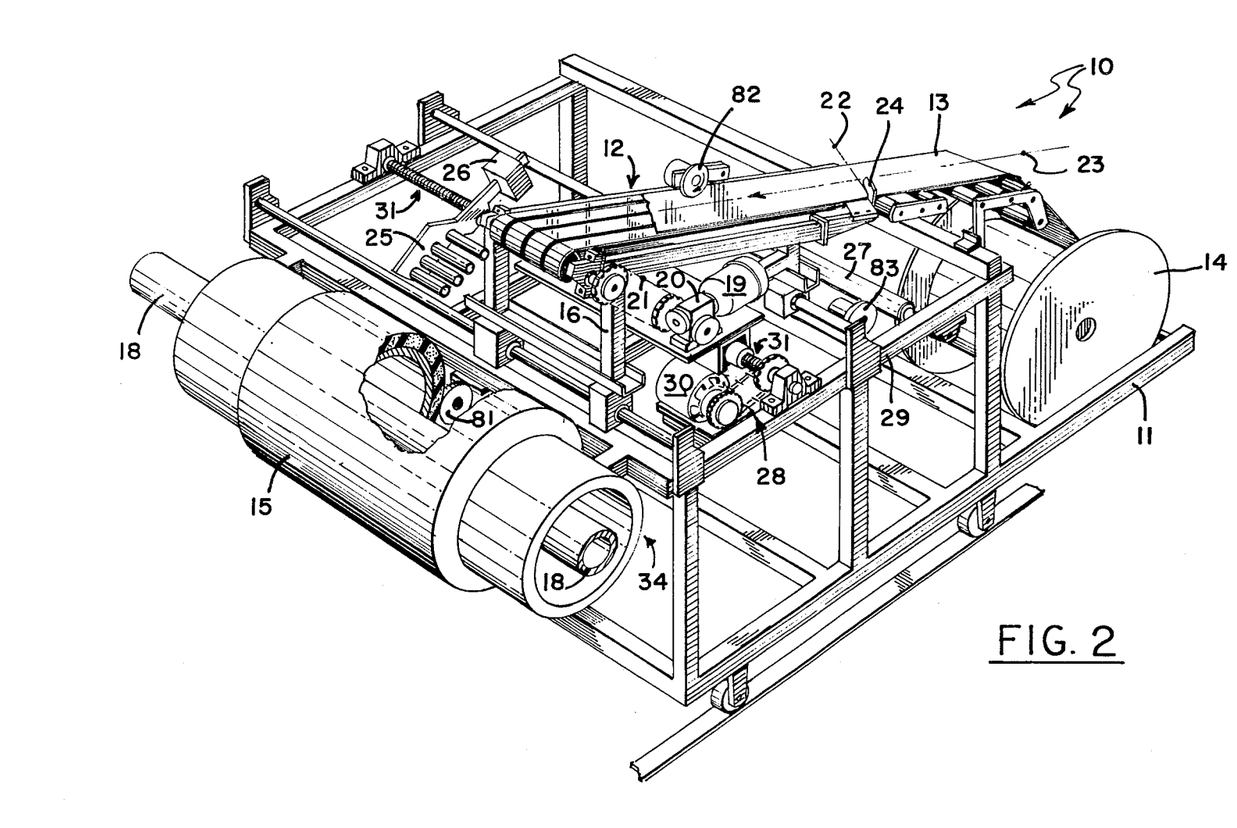
FIG. 2 is a perspective view of the server as shown in FIG. 1, depicting in particular aspects of an electrical drive tracking system and embodied method for the conveyor.

FIGS. 1 and 2 illustrate, in perspective, a server, indicated generally by the numeral 10, for a tire building machine with which the present invention is suitable for use. Server 10 includes a fixed frame 11 supporting at least one conventional belt conveyor 12 upon which rides a component material 13 originating from a continuous roll on reel 14 to be selectively delivered to building drum 15. A slidable frame 16 is interposed between fixed frame 11 and conveyor 12 to permit lateral position adjustment of the conveyor 12 as detailed hereinafter. Drum 15 may be carried about shaft 18 for rotation in either a clockwise or counterclockwise direction by any suitable means, the detailed structure of which is not relevant hereto.

It should be noted that the electrical control system and method for a tire building machine server described herein is suitable for use on many conventional servers. Nevertheless, the present invention has been shown as used with a novel tire building system detailed in U.S. Pat. No. 4,314,864. Reference may be made to the copending application for further details of the specific servers with which the present invention may be utilized.

As envisioned by this novel tire building system, a plurality of servers 10 are aligned parallel to the linear direction of travel of a moving headstock which includes a building drum 15. The headstock sequentially moves in front of each server 10 which then moves into position adjacent thereto. Next, component material 13 is fed onto building drum 15, the server 10 is withdrawn, and the headstock moved to the next adjacent server 10.

Conveyor 12 has a conveyor drive motor 19 which acts through angle drive 20 and belt 21 to move material 13. Conveyor drive motor 19 may operate to drive material 13 in either of two directions relative to an arbitrarily selected reference axis 22 transverse to the longitudinal reference axis 23 of conveyor 12—i.e., forward onto drum 15 or backward onto reel 14. A hot knife 24 may be provided for cutting the component material 13 to the desired length for the tire under construction. A material guiding rack 25 having a counter weight 26 may be pivotably attached to slidable frame 16 for guiding the component material 13 from conveyor 12 onto building drum 15.

Inasmuch as component material 13 often times will be uncured rubber having extensive adhesive tackiness extruded in continuous rolls, it may be desirable to provide a protective liner between successive layers of the material on reel 14. Roller 27 may be provided to take-up this liner as component material 13 is uncoiled from reel 14.

Server 10 includes a lateral position adjustment mechanism 28 for accurately and precisely controlling the lateral position of conveyor 12 relative to any arbitrarily selected fixed reference frame. Merely for convenience in discussion, the transverse and longitudinal axes of the selected fixed reference frame may be taken to be the transverse and longitudinal axes of conveyor 12 at that point in space when conveyor 12 is positioned adjacent and parallel to the right hand upper edge 29 of fixed frame 11. Lateral position adjustment mechanism 28 includes lateral position drive motor 30 driving a conventional screw drive 31 which in turn permits lateral sliding adjustment of conveyor 12.

Figure 3:
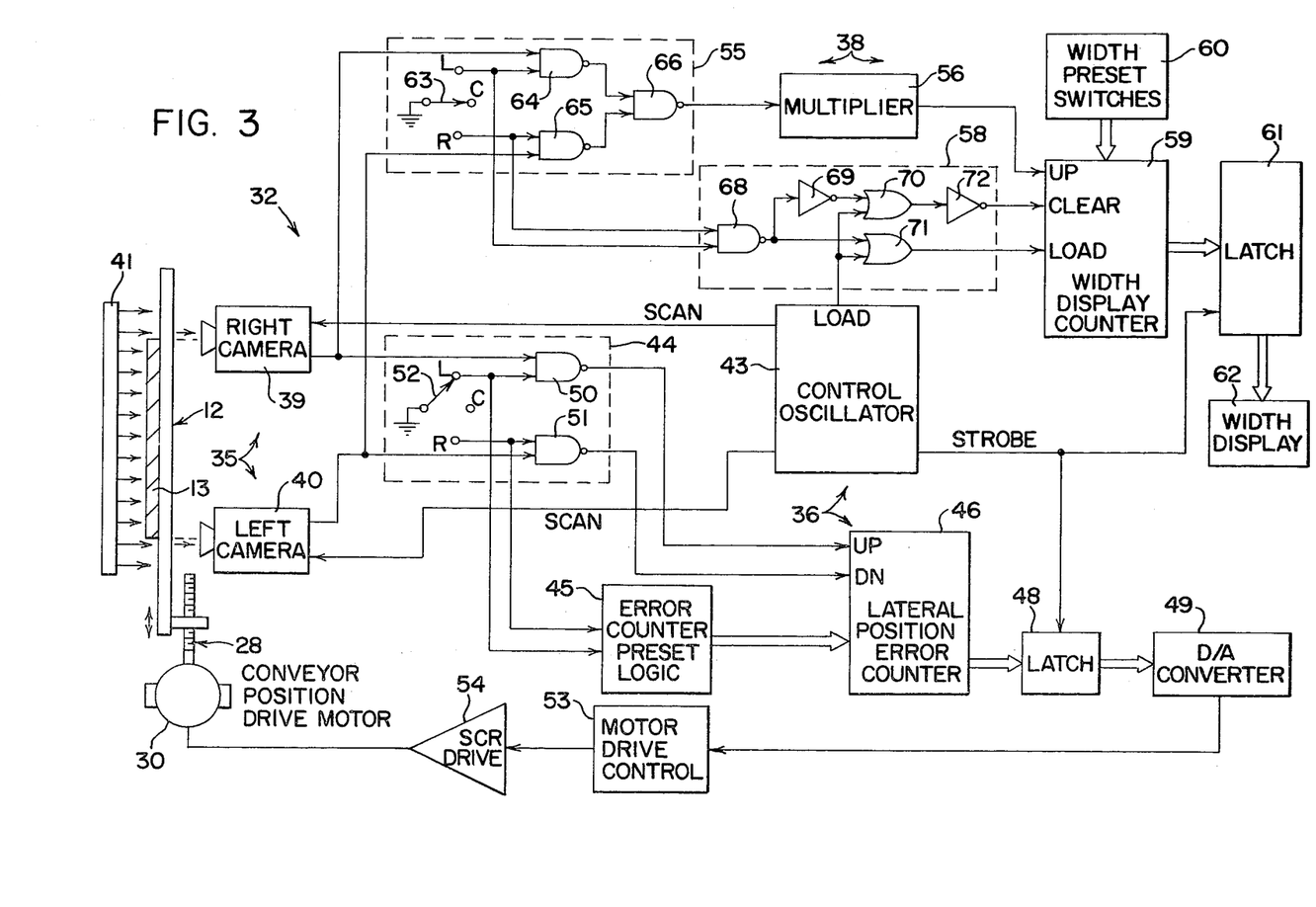
FIG. 3 is a block diagram of an exemplary electrical guidance system and embodied method for the conveyor according to the concept of the present invention, illustrating several elements schematically.
Figure 4:
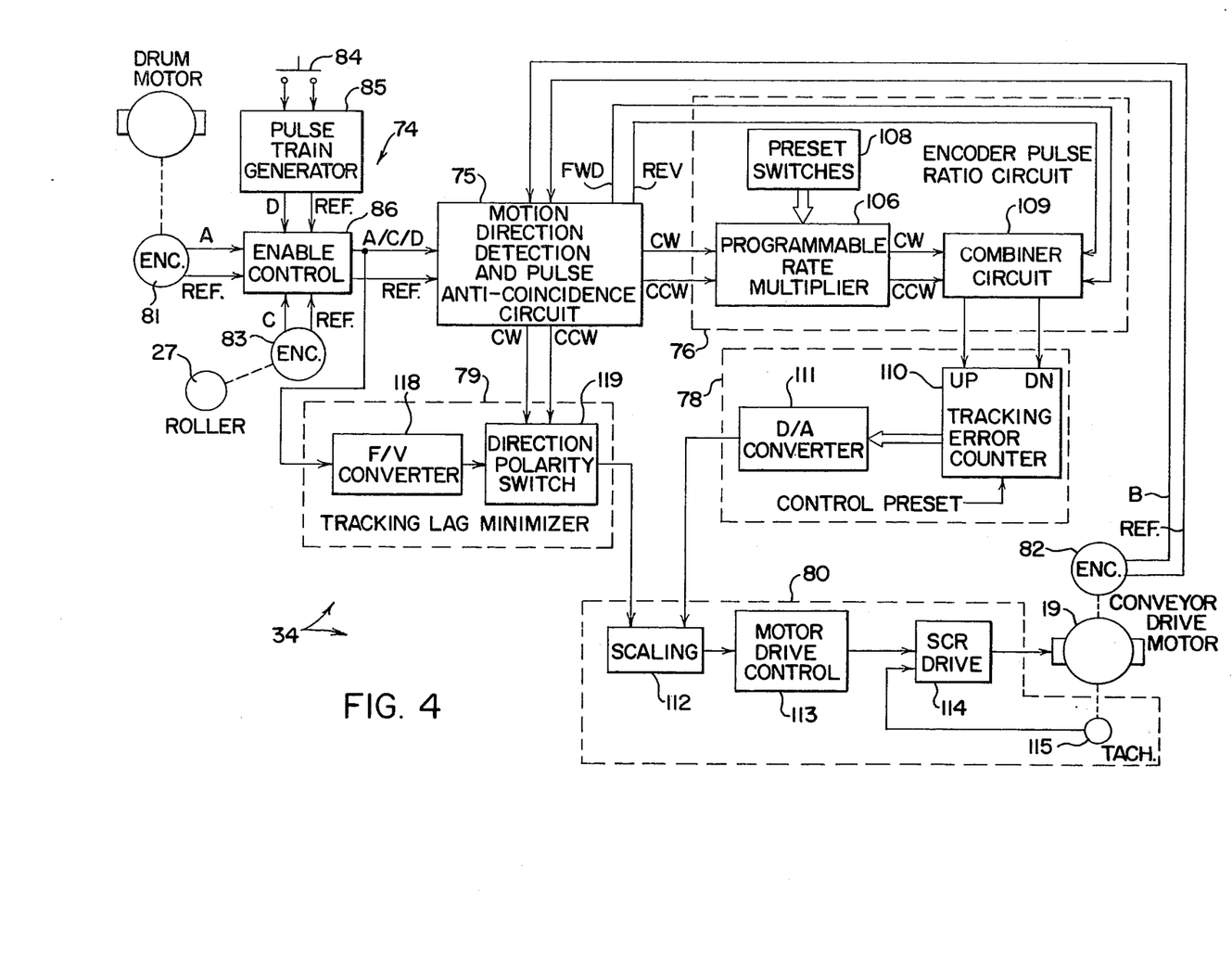
FIG. 4 is a block diagram of an exemplary electrical drive tracking system and embodied method for the conveyor according to the concept of the present invention.
Figure 5:
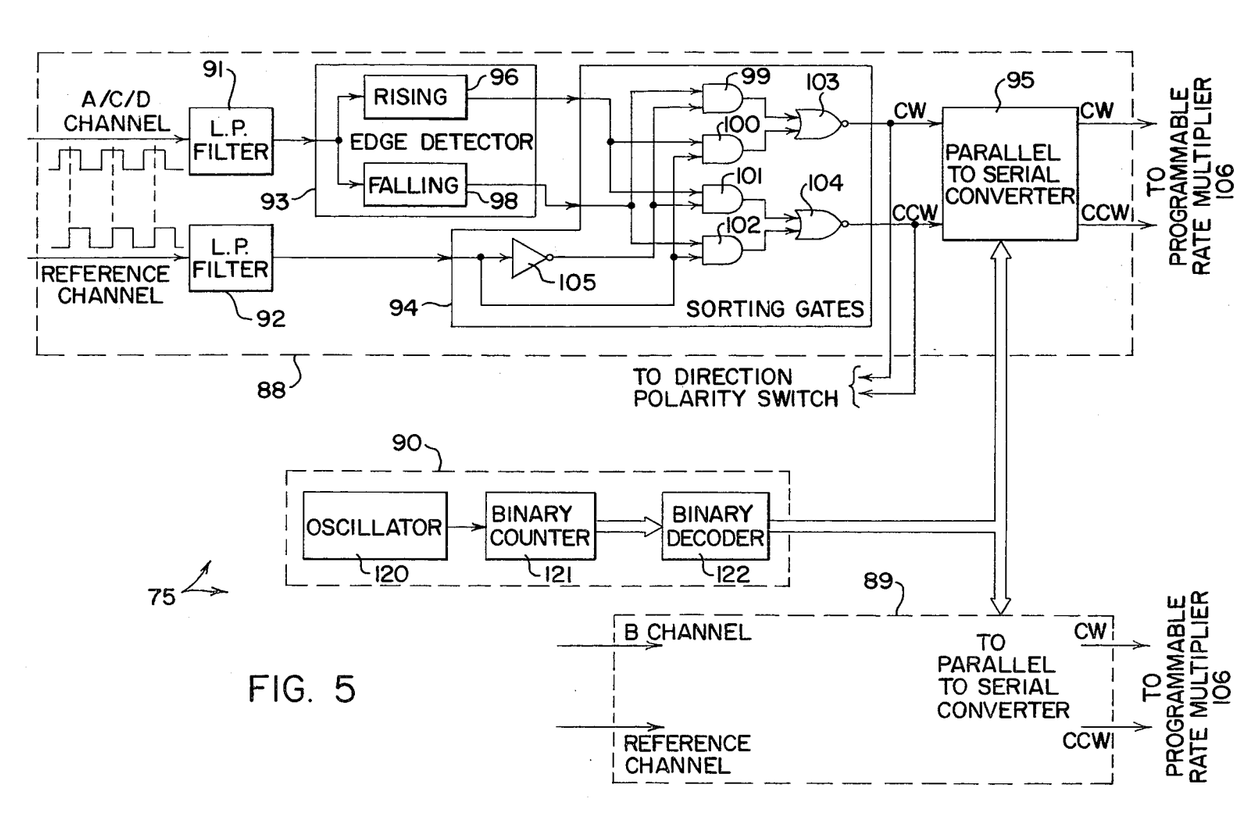
FIG. 5 is a more detailed, partial schematic diagram of an exemplary motion direction detection and anticoincidence circuit shown in FIG. 4 in block diagram form.

An electrical control system and embodied method for server 10 which is generally indicated by the numeral 32, includes an electrical guidance system 33 and an electrical drive tracking system 34. FIGS. 1 and 3 respectively illustrate the mechanical aspects and electrical circuitry for electrical guidance system 33. FIGS. 2, 4 and 5 respectively illustrate the mechanical aspects and electrical circuitry for electrical drive tracking system 34.

Electrical guidance system 33 accurately and precisely controls the lateral position of conveyor 12. Guidance system 33 includes position sensor system 35, a lateral position error detection and correction circuit 36, and a material width determining and display circuit 38.

Position sensor system 35 may include two conventional video cameras 39 and 40 adjustably mounted below both the right and left edges of material component 13 as it feeds from material guiding rack 25 to drum 15. A suitable light source, such as florescent fixture 41, is mounted on fixed frame 11 above conveyor 12 aligned with video cameras 39 and 40. Video cameras 39 and 40 continually monitor the position of the shadow cast by the edges of component material 13 and each provides a pulse train output signal having a number of pulses which are indicative of the position of the respective edges relative to the fixed reference frame. The line scan camera commercially available from Reticon Corporation of Sunnyvale, Calif. having model number LC600 has been found acceptable for use herewith. This camera divides the field of view into 256 intervals and provides a pulse train whose number of pulses is correlated to the position of the material in the field of view. For initial setup purposes to be described further below, video cameras 39 and 40 may be laterally adjustable by camera position drive screw 42.

Lateral position error detection and correction circuit 36 includes control oscillator 43, mode select logic 44, error counter preset logic 45, lateral position error counter 46, latch 48, and digital to analog (hereinafter D/A) converter 49. Control oscillator 43 provides several output pulse signals to synchronize the operation of guidance system 33. Two output lines from control oscillator 43 are received by cameras 39 and 40 to sequentially enable scanning by the selected camera of its field of view. The pulse train output signals from cameras 39 and 40 are respectively received by two-input NAND gates 50 and 51, which together with a conventional three position mode selector switch 52 form mode select logic 44.

Mode selector switch 52 has its common terminal connected to ground, two of its output terminals respectively connected to the remaining input of NAND gates 50 and 51, and its third output terminal left unconnected. The output signals from NAND gates 50 and 51 are received by the up and down input terminals, respectively, of lateral position error counter 46.

Lateral position counter 46 may be any conventional, presettable up/down counter having adequate capacity to reach a maximum count at least equal to the number of intervals in the video camera field of view. Error counter preset logic 45 is also connected to the two terminals of mode selector switch 52 that are connected to NAND gates 50 and 51. Error counter preset logic 45 recognizes which of the three possible positions mode selector switch 52 is placed in, and provides the necessary output signals to lateral position error counter 46 to preset the same at a preselected count dependent upon the selected mode of operation. The final count in lateral position error counter 46 is received by latch 48 upon command from control oscillator 43 by its strobe counter output signal. The output from latch 48 is received by D/A converter 49 and converted into an analog voltage signal.

The analog voltage signal output from digital to analog converter 49 is received by conveyor position motor drive control 53 which provides an output signal to silicon controlled rectifier (hereinafter, SCR) drive 54. The output of SCR drive 54 operates conveyor position motor 30 to return component material 13 to the desired position. Where, as found suitable here, conveyor position motor 30 is selected to be a conventional permanent magnet DC motor, conveyor position motor drive control 53 and SCR drive 54 both may be any of the multitude of commercially available drive controls and SCR drives.

Lateral position error detection and correction circuit 36 may operate in any of three modes, detecting the error in the lateral position of component material 13 based upon a change in position of its right edge, its left edge, or its center-line. Lateral position error detection and correction circuit 36 basically operates by setting error counter 46 to a preselected number dependent upon the selected mode of operation, counting the number of pulses generated by the cameras, and providing to motor drive control 53 an error correction output signal proportional to final count in the error counter whereby conveyor position motor 30 may correct the lateral position of component material 13.

In the event lateral position is to be maintained dependent upon the center-line position of component material 13, both cameras 39 and 40 are utilized. Initially, camera position drive screw 42 is operated to adjust the lateral position of cameras 39 and 40 so that when the center-line of component material 13 is where desired in the fixed reference plane both its edges will be at a preselected position in the field of view of the cameras 39, 40. Where the desired position of the center-line of component material 13 is selected to be half way between the field of view of both cameras 39 and 40, both cameras will provide an equal number of pulses upon the occurrence of proper alignment. Mode selector switch 52 is placed in its center-tap position, permitting the inputs to both NAND gates 50 and 51 to remain ungrounded, thereby enabling both NAND gates 50 and 51.

Error counter preset logic 45, recognizing that both NAND gates inputs connected to mode selector switch 52 are ungrounded, loads a preselected number into lateral position error counter 46. Although this number may be arbitrarily selected, it is convenient to choose this number so that it will cause D/A converter 49 to generate an analog error signal having a voltage magnitude of zero volts. Using a 12-bit error counter 46, and the 12-bit D/A converter having model number DAC 80 manufactured by Burr-Brown Research Corporation of Tucson, Ariz., it was found convenient to preset the number 2048 into 12-bit error counter 46 for this mode of operation.

A typical operational cycle would begin with control oscillator 43 enabling scanning by one of the cameras 39, 40, which for illustration purposes shall be the right camera 39. Upon receipt of a scan output signal from control oscillator 43, camera 39 generates a pulse train output signal having a number of pulses indicative of the position of the edge of component material 13 in its field of view, say 110. This pulse train output signal passes through NAND gate 50 to the up input of lateral position error counter 46, causing the upward incrementation of the same to a count of 2158 in accordance with the example. Control oscillator 43 next enables scanning of the left camera 40, which decrements lateral position error counter 46. With component material 13 laterally positioned where desired, camera 39 shall decrement lateral position error counter 46 for a count of 110, leaving a final count of 2048 in counter 46. Where component material 13 is not laterally positioned as desired, unequal up and down counts shall occur leaving a final count greater or less than 2048, depending upon the direction and magnitude of misalignment. Control oscillator 43 next provides a strobe pulse to latch 48 loading this final count into latch 48. The final count is received by D/A converter 49 and converted to an analog voltage signal the magnitude of which motor drive control 53 receives, recognizes and initiates the required lateral position correction, whereupon the cycle begins anew.

In the event lateral position is to be maintained based upon either edge of component material 13, only one of the cameras 39 and 49 are utilized. In this instance mode selector switch 52 is placed in the tap position necessary to ground the input to the NAND gate 50 or 51 which receives the signal from the camera not in use, thereby disabling the same. Error counter preset logic 45, recognizes which NAND gate input connected to mode selector switch 52 is ungrounded, and loads a different preselected number into lateral position error counter 46. The only difference in edge guiding operation from that of centerline guiding is that counter 46 will count only in one direction, determined by the selection of camera 39 or 40.

Guidance system 33 provides a circuit 38 for determining and displaying the width of component material 13. Material width determining and display circuit 38 includes width display select logic 55, multiplier 56, width display counter control logic 58, width display counter 59, width preset switches 60, latch 61, and width display 62. Width display select logic 55 includes a conventional three position mode selector switch 63 and two-input NAND gates 64, 65 and 66. NAND gates 64 and 65 respectively receive the pulse train output signals from cameras 39 and 40 and are connected to two of the output terminals of mode selector switch 63, which switch has its common terminal connected to ground and its remaining output terminal left unconnected. The output signals from NAND gates 64 and 65 are received by NAND gate 66, whose output terminal is in turn connected to multiplier 56.

Multiplier 56 may be any conventional multiplier providing twice the number of pulses in its output signal than is in the pulse train signal it receives from NAND gate 66. The output signal from multiplier 56 is received by the up terminal of width display counter 59.

Width display counter 59 may be any conventional, presettable up/down counter having adequate capacity to reach a maximum count at least equal to the number of intervals in the field of view of both video cameras as multiplied by multiplier 56. A plurality of thumbwheel switches 60 are provided for presetting width display counter to a preselected number further detailed below. It has been found convenient to utilize a binary counter for width display counter 59.

Width display counter control logic 58 includes two-input NAND gate 68, inverter 69, two-input OR gates 70 and 71, and inverter 72. NAND gate 68 is connected to the two output terminals of mode selector switch 63 to which NAND gates 64 and 65 are connected. The output signal from NAND gate 68 is received by inverter 69 and OR gate 71. The output signal from inverter 69 is received by OR gate 70. Both OR gates 70 and 71 also receive a load command output pulse signal from control oscillator 43. The output signal from OR gate 70 is inverted by inverter 72 and received by the clear input terminal of width display counter 59. The output signal from OR gate 71 is received by the load input terminal of width display counter 59.

The output from width display counter 59 is received by latch 61 which also receives the same strobe output signal from control oscillator 43 that is received by latch 48. Width display 62, which receives the output from latch 61, may be any conventional display, such as a seven-segment LED display, and may be housed within a control enclosure 73 shown in FIG. 1 mounted upon fixed frame 11. Control enclosure 73 may house the entire electronic circuitry for guidance system 33.

In order to understand the operation of material width determining and display circuit 38 it first must be appreciated that the width of component material 13 may exceed the field of view of cameras 39 and 40 either alone or in combination. However, it is possible to determine the width of component material 13 by knowing the width between the maximum field of view of cameras 39 and 40 and monitoring variations in the lateral position of both edges of component material 13. Material width determining and display circuit 38 accomplishes this result by presetting a count representative of the width between the maximum field of view of cameras 39 and 40, which may be referred to as the "deadband," into width display counter 59 and by modifying this count with the pulse train output signals from cameras 39 and 40, indicative of variations in the position of the edges of component material 13.

Prior to operation of material width determining and display circuit 38, mode selector switch 63 is placed in the tap position where its common terminal is not connected to either NAND gate 64 or 65, resulting in the output signal from NAND gate 68 going to a low logic level whereby OR gates 70 and 71 are respectively disabled and enabled. In this state a new operational cycle of material width determining and display circuit 38 is begun each time a load command output pulse signal is received from control oscillator 43, loading the deadband width count into width display counter 59.

When scanning of cameras 39 and 40 is enabled by control oscillator 43 as detailed hereinabove, their pulse train output signals pass through the NAND gates of width display select logic 55 to multiplier 56. Multiplier 56 multiplies the number of pulses by a factor which corrolates the spacing of the intervals in cameras 39 and 40 with the desired unit of measurement to be displayed by width display 62. Where the aforementioned cameras from Reticon Corporation are employed herewith, a two times multiplier yields a count representative of the width of component material 13 in inches.

The pulse train output signal from multiplier 56 is received at the desired counting input terminal of width display counter 59, in this case selected arbitrarily to be the up input terminal, whereupon width display counter 59 is suitably incremented. When control oscillator 43 generates its strobe output signal to latch 48, this signal is simultaneously received by latch 61, loading the final count from width display counter 59 into latch 61. This final count is received by width display 62, which converts this final count into a number suitable for display by the same in the desired unit of measurement.

It is possible to utilize width determining and display circuit 38 to confirm that the initial set-up position of cameras 39 and 40 is as desired and that cameras 39 and 40 are operating properly. This is separately accomplished for each camera by placing mode selector switch 63 in the tap position necessary to ground the input to the NAND gate 64 or 65 which receives the signal from the camera not to be tested, thereby disabling the same. This also results in the output signal from NAND gate 68 going to a high logic level whereby OR gates 70 and 71 are respectively enabled and disabled. In this state a new operational cycle of material width determining and display circuit 38 is begun each time a load command output pulse signal is received from control oscillator 43, clearing width display counter 59 through OR gate 70 and inverter 72. When scanning of the selected camera is enabled by control oscillator 43 as detailed hereinabove, its pulse train output signal passes through the NAND gates of width display select logic 55 to multiplier 56. Thereafter the operation of width determining and display circuit 38 is as outlined hereinabove.

It must be emphasized, however, that in this testing mode the final count in width display counter 59, and the corresponding number displayed in width display 62, are indicative of the position of component material 13 in that camera's field of view, and are not representative of the width of component material 13. In preselecting the desired position of component material 13, this number is fixed for both cameras and may be utilized to confirm proper set-up and operation. For example, where the desired position of the center-line of component material 13 is selected to be half way between the field of view of both cameras 39 and 40, both cameras when tested should display the same number. If the same number is not obtained upon selective testing of both cameras, cameras 39 and 40 may be realigned with camera position drive screw 42.

Electrical drive tracking system 34, the mechanical aspects of which may be seen in FIG. 2 and the electrical elements of which may be seen in FIGS. 4 and 5, is provided to control the instantaneous position of component material 13 relative to the transverse reference axis 22 such that as component material 13 is delivered to drum 15 a preselected locus of points along the longitudinal axis of component material 13 may be laid atop a preselected locus of points on the circumference of drum 15. Electrical drive tracking system 34 achieves this end by corollating the server material feed rate with the rate of rotation of the building drum 15, adjusting the length to which component material 13 is to be cut and allowing for stretching and tensioning that may or must occur during assembly and/or final curing.

Electrical drive tracking system 34 includes encoder generators and enable control 74, motion direction detection and pulse anticoincidence circuit 75, encoder pulse ratio circuit 76, tracking error correction circuit 78, tracking lag minimizer 79, and conveyor drive circuit 80. Encoder generators and enable control 74 includes encoder generators 81, 82 and 83, single-pole, momentary contact pushbutton switch 84, pulse train generator 85, and enable control 86. Encoder generators 81, 82 and 83 may be any conventional rotary pulse generator providing two square wave, pulse train output signals the number of pulses in which is proportional to the incremental rotation of the rotary pulse generator shaft and the electrical phase relationship between which is indicative of the direction of rotation of the shaft. For ease of discussion, the two pulse train output signals from encoder generators 81, 82 and 83 shall be respectively referred to as "A-reference", "B-reference" and "C-reference" channels. One rotary pulse generator found suitable for use herewith has been the incremental shaft encoder manufactured by the Control and Systems Division of Gould, Inc. in Wilmington, Mass. and sold under its registered trademark TRUMITE.

As best shown in FIG. 2, encoder generators 81, 82 and 83 are mounted upon fixed frame 11 in any suitable manner (the details of which are not relevant hereto) so as to be urged into continuous biased engagement for rotation with the motion of building drum 15, conveyor 12 and liner take-up roller 27, respectively. For initial set-up or manual jog feeding of component material 13, activation of pushbutton 84 permits pulse train generator 85, connected thereto, to generate pulse train output signals "D-reference" similar to that of encoder generators 81, 82, 83.

Returning to FIG. 4, the pulse train output signals from encoder generators 81, 83 and from pulse train generator 85 are all received by enable control 86 which simply gates one of the three pairs of signals to motion direction detection and pulse anticoincidence circuit 75. The gated signal may be selected manually by, for example, a multiple-pole, rotary switch (not shown), or automatically in a manner not relevant hereto.

Motion direction detection and pulse anticoincidence circuit 75 is illustrated in further detail in FIG. 5 and includes two identical converter circuits 88, 89 (only one of which is drawn and will be discussed in detail) and control timer 90. Converter circuit 88 receives whichever pair of encoder generator pulse train output signals is selected by enable control 86. Converter 89 receives the pair of pulse train output signals generated by conveyor encoder generator 82. Converter 88 determines the actual direction of motion of the drum, the actual direction of motion of liner take-up roller 27, or the desired direction of conveyor jog (dependent upon which encoder is selected by enable control 86), and provides separate output signals for each direction of motion (clockwise or forward, and counterclockwise or reverse). Converter 89 performs a similar function for the actual direction of conveyor motion.

Converter 88 includes two conventional low pass filters 91 and 92, edge detector 93, sorting gates 94, and a parallel to serial converter 95. Edge detector 93 includes rising edge detector circuit 96 and falling edge detector circuit 98. Sorting gates 94 includes four two-input AND gates 99, 100, 101, 102, two two-input NOR gates 103 and 104, and inverter 105.

Low pass filters 91 and 92 respectively receive the A, C or D and reference channel signals from enable control 86 and eliminate noise therefrom. The output signal from low pass filter 91 is received by edge detector 93 which, using any of the multitude of well-known transition detection circuits, provides a pulse output signal for each change from low to high (rising transition) logic levels and a separate pulse output signal for each change from high to low (falling transition) logic levels.

The pulse output signal from rising edge detector circuit 96 is received by AND gates 100 and 101. The pulse output signal from falling edge detector circuit is received by AND gates 99 and 102. The output signal from low pass filter 92 is received by AND gates 100 and 102 and by inverter 105, whose output is in turn received by AND gates 99 and 101. The output signals from AND gates 99 and 100 are received by NOR gate 103 while the output signals from AND gates 101 and 102 are received by NOR gate 104.

Edge detector 93 together with sorting gates 94 determines the direction of motion represented by the electrical phase relationship between the letter-identified and reference encoder generator signals received by converter 88, as exemplified by the two wave forms shown by their respective inputs to low pass filters 91 and 92. These waveforms are in timed relation although not necessarily to scale.

In order to ascertain this phase relationship, it is necessary to detect each logic level transition in one of the encoder generator signal and its direction (rising or falling) which is done for the letter-identified channel signal by edge detector 93. Sorting gates 94 next compare the timing of these transitions with the logic level of the reference channel signal and its inversion, providing four possible combinations of transitions. Two of these combinations indicate motion in one direction and the remaining two indicate motion in the opposite direction. By taking the NOR of the two pairs of combinations, a separate signal may be provided for motion in each direction, the number of pulses in each signal being indicative of an incremental change in position and the frequency of each pulse train being indicative of the rate of change in position. In the present instance the output signal from NOR gates 103 and 104 are respectively indicative of motion in the clockwise (or forward) and counterclockwise (or reverse) directions.

Of course, in many instances encoder generators 82, and 81, 83 or 85 will be simultaneously providing asynchronous output pulses. Ultimately these output pulses must be utilized to provide a single error signal indicative of any error between the actual position of component material 13 relative to the actual position of drum 15. It is therefore necessary to insure that none of these pulses are simultaneously provided to the remaining circuitry. Control timer 90 together with parallel to serial converter 95 performs this function.

Control timer 90 includes a conventional oscillator 120 having a frequency compatible with that of edge detector 93, a conventional counter 121, and a conventional decoder 122. Control timer 90 and its components may be of the binary type and may be hereinafter referred to as such. Counter 121 and decoder 122 must provide a count sufficiently large to permit the timed sequential operation of both converters 88 and 89. A count of approximately sixteen with an oscillator frequency of approximately 2 MHz has been found to perform adequately.

Binary control timer 90 simply permits the sequential output of the signals from converters 88 and 89. For example, upon count one, parallel to serial converter 95, which contains a plurality of latches (not shown) for receiving and latching the output signals from converters 88 and 89, may be enabled so as to provide the previously latched output from NOR gate 103 to encoder pulse ratio circuit 76. At count four this portion of parallel to serial converter 95 may be reset. At count five, parallel to serial converter 95 may be enabled so as to provide the previously latched output from NOR gate 104 to encoder pulse ratio circuit 76. At count eight this portion of parallel to serial converter 95 may be reset. The remaining cycle of binary control timer 90 may similarly permit the sequential output of the signals from converter 89.

Returning to FIG. 4, encoder pulse ratio circuit 76 may be seen to include programmable rate multiplier 106, conventional preset switches 108, and a combiner circuit 109. Programmable rate multiplier 106, which receives both the sequenced output signals from parallel to serial converter 95, may be any conventional circuit for providing a preselected number of output pulses for a given number of input pulses. It has been found convenient to utilize a plurality of the readily commercially available synchronous decade rate multiplier integrated circuits such as supplied by Texas Instruments, Inc. of Dallas, Tex. having the model designation Ser. No. 74167. Thus, the output from programmable rate multiplier 106 is two pulse train signals similar to that from converter 88, with the exception that the number of pulses in the output from programmable rate multiplier 106 is in a ratio to the number in the output signals from converter 88 as determined by preset switches 108.

The two pulse train output signals from programmable rate multiplier 106 are received by combiner circuit 109 along with the two pulse train output signals from converter 89. Combiner circuit 109 sequentially combines the pulses in the clockwise (or forward) pulse train output signal from converter 88 with the pulses in the conveyor reverse direction pulse train output signal from converter 89, and sequentially combines the pulses in the counterclockwise (or reverse) pulse train output signal from converter 88 with the pulses in the conveyor forward direction pulse train output signal from converter 89. Inasmuch as all output signals from converters 88 and 89 are sequenced by control timer 90 to occur seriatum, combiner circuit 109 simply may be two two-input OR gates (not shown).

The two directional pulse train output signals from combiner circuit 109 are received by the up and down terminals of a tracking error counter 110, which counter together with a D/A converter 111 form tracking error correction circuit 78. Tracking error counter 110 may be any conventional up/down counter having adequate capacity to reach a maximum count at least equal to the maximum number of pulses that can be provided by any of the encoder generators over the maximum sampling time with the largest desired rate multipling factor. A 12-bit binary counter has been successfully employed with the system described herein. As with lateral position error counter 46, tracking error counter 110 preferrably should be preset to a number that will cause D/A converter 111, which receives the final count in tracking error counter 110, to generate an analog error signal having a voltage magnitude of zero volts.

Conveyor drive circuit 80 includes scaling circuit 112, motor drive control 113, SCR drive 114, and tachometer 115. Scaling circuit 112 may be a conventional circuit for scaling the voltage magnitudes and summing the output signal from D/A converter 111, and the output signal from tracking lag minimizer 79. The analog voltage output signal from scaling circuit 112 is received by conveyor drive motor drive control 113 which provides an output signal to SCR drive 114 for operating conveyor drive motor 19. Where, as found acceptable here, conveyor drive motor 19 is selected to be a conventional permanent magnet DC motor, conveyor drive motor drive control 113 and SCR drive 114 both may be any of the multitude of commercially available drive controls and SCR drives suitably modified as would occur to one of ordinary skill in the art. Tachometer 115 provides a feedback signal whose voltage magnitude is proportional to the rotational velocity of the conveyor drive motor 19 for assisting in reducing response time and improving stability of conveyor drive motor 19 to changes in drive voltages.

Tracking lag minimizer 79 includes a conventional frequency to voltage (F/V) converter 118 and a direction polarity switch 119. F/V converter 118 receives whichever encoder generator pulse train output signal is selected by enable control 86 and generates an analog voltage signal whose magnitude is in proportion to the frequency of the selected pulse train signal. The analog voltage signal from F/V converter 118 is received by direction polarity switch 119 along with the two directional pulse train output signals from NOR gates 103 and 104. Direction polarity switch 119, which may be a conventional field effect transistor switch, monitors the direction of motion as indicated by the two directional pulse train output signals from NOR gates 103 and 104 and insures that the analog voltage signal from F/V converter 118 has one polarity, such as positive, when motion is in the clockwise (or forward) direction and an opposite polarity, such as negative, when motion is in the counterclockwise (or reverse) direction. The polarity modified analog voltage signal from direction polarity switch 119 is received by scaling circuit 112 as noted above.

It should be emphasized that conveyor drive motor 19 is not operated independently. Rather, electrical drive tracking system 34 monitors the instantaneous deviation between the position of a locus of points on component material 13 relative to a locus of points on drum 15 and operates conveyor drive motor 19 so as to minimize and eliminate any instantaneous deviation.

Electrical drive tracking system 34 basically operates by initially positioning component material 13 so that its leading edge is positioned where desired upon drum 15, generating pulses the number of which is indicative of the distance traveled by the preselected locus of points on the circumference of drum 15, generating pulses the number of which is indicative of the distance traveled by the conveyor 12 feeding component material 13, counting in tracking error counter 110 the number of pulses the resultant of which is indicative of the difference in distance traveled by the drum 15 and conveyor 12, and providing to conveyor drive circuit 80 a tracking error correction output signal proportional to the final count in tracking error counter 110 whereby the distance traveled by conveyor 12 is made to track that of drum 15.

Several actions must be taken prior to construction of a tire. First, the operator must select a rate multiplier factor to be preset into preset switches 108. The rate multiplier factor is utilized to control the ratio between the number of pulses actually provided by encoder generator 81 and the number of pulses actually passed to combiner circuit 109. In this manner the error count is reduced, and the incremental change in position of component material 13 moved less than that of drum 15, thereby resulting in component material 13 being stretched for application to drum 15 with greater tension.

Other actions prior to construction of a tire include presetting tracking error counter 110 to a preselected number that provides a zero volt error correction signal from D/A converter 111, precutting the first length of component material 13 to be fed onto drum 15, and aligning the leading edge of the precut length of component material 13 with the desired point of application upon drum 15. One possible procedure for precutting the first length of component material 13 may begin with operation of hot knife 24 to insure the length of component material 13 begins at a fixed location on conveyer 12. Next drum 15 may be rotated for precisely one revolution, causing electrical drive tracking system 34 to feed component material 13 as set forth below.

Hot knife 24 may again be operated, cutting the desired length of component material 13. Finally the operator may cause enable control 86 to gate the D-reference pair of signals from pulse train generator 85 so that by operation of pushbutton 84 the operator may manually position the leading edge of the precut length of component material 13 atop the desired point of application upon drum 15.

During actual tire assembly, enable control 86 gates the A-reference pair of signals from encoder generator 81 to converter 88 of motion direction detection and pulse anticoincidence circuit 75. Converters 88 and 89 sequentially provide separate pulse train output signals for indicating the direction and amount of incremental position change in drum 15 and conveyor 12, respectively, as explained above. Programmable rate multiplier 106 multiples both pulse train output signals from converter 88 by the preselected factor. For example, for every 1000 pulses generated by encoder generator 81, programmable rate multiplier 106 may provide 850 to combiner circuit 109.

Combiner circuit 109 sequentially combines the pulses from converter 89 with that from programmable rate multiplier 106 for each directional pulse train signal. The combined pulse train output signals from combiner circuit 109 increment (in the case of clockwise or forward motion) and decrement (in the case of counterclockwise or reverse motion) the preset count in tracking error counter 110. This yields an error correction signal whose magnitude is reduced by the actual motion of component material 13. The final count in tracking error counter 110, which represents the magnitude of the instantaneous deviation in the actual position of component material 13 from its desired position relative to the instantaneous actual position of drum 15, is converted to an analog voltage error signal by D/A converter 111 and fed to conveyor drive circuit 80, proportionally increasing or decreasing the rotation of conveyor drive motor 19.

Each time binary control counter 90 goes through its cycle the final count in tracking error counter 110 is updated, resulting in an updated voltage magnitude to conveyor drive control 80. To reduce the position lag and response time lag of conveyor drive motor 19 to changes in the position of drum 15, tracking lag minimizer 79 provides an additional feedback signal to scaling circuit 112. Tracking lag minimizer 79 continually monitors the frequency of the selected channel signal from enable control 86 and converts this to a voltage signal which is added (with proper polarity) to the error correction signal from D/A converter 111. Additional feedback may be provided in a conventional manner by tachometer 115 whose signal voltage, proportional to the rotational velocity of conveyor drive motor 19, is fed back to SCR drive 114.

It may be noted that although the directional pulse train output signals from drum encoder generator 81 have their number of pulses multiplied by programmable rate multiplier 106, with suitable circuit modifications apparent to the skilled artisan any or all of the directional pulse train output signals may also or alternatively be similarily multiplied. For example, instead of providing 850 pulses for every 1000 pulses from drum encoder generator 81, it would be possible to provide 1150 pulses for every 1000 pulses from conveyor encoder generator 82.

It should also be noted that in describing the construction and operation of the logic elements within circuit 10, the so-called "positive true logic" convention has been adopted. As would be recognized by a skilled artisan, other circuits employing a similar or different logic convention could be utilized to implement the desired functions, and when so utilized clearly fall within the scope of the present invention. Similarly, the phase relationships selected for utilization in the instant circuitry to signify various directions of motion may be altered in whatever manner desired so long as the necessary consistency is maintained therebetween.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of controlling a tire building machine server.

I claim:

1. A circuit for controlling the position of a material on a conveyor relative to a locus of points of an elastic material on the surface of a building drum having a drum rotation drive motor, the conveyor having both longitudinal and transverse reference axes, a conveyor position drive motor and conveyor drive motor, comprising:

first sensor means for generating an output signal indicative of a position of the material relative to the transverse reference axis and the direction of any motion thereof;

second sensor means for generating an output signal indicative of the position of the locus of points of the elastic material on the surface of the building drum and the direction of any rotation thereof;

third sensor means for generating a pulse train output signal having a number of pulses that is indicative of the position of the material relative to the longitudinal reference axis;

ratio means including rate multiplier means for receiving said output signal from one of said first or said second sensor means and generating an output signal in a preselected proportion thereto;

tracking error correction means receiving said output signal from said ratio means and providing an output signal to the conveyor drive motor whereby the conveyor drive motor maintains the desired position of the material relative to the transverse reference axis and the locus of points of the elastic material on the surface of the building drum;

position error counter means receiving said pulse train output signal from said third sensor means and counting from a preselected number for a count proportional to the number of pulses in said pulse train output signal, the final number in said position error counter means indicative of the necessary correction in the position of the material to maintain a preselected position relative to the longitudinal reference axis; and, position error correction means receiving said final number from said position error counter means and providing an output signal to the conveyor position drive motor whereby the necessary correction to return the material to its preselected position relative to the longitudinal reference axis is achieved.

2. A circuit, as set forth in claim 1, further including width display counter means for receiving said pulse train output signal from said third sensor means and counting from a preselected number for a count proportional to said number of pulses in said pulse train output signal, said final number in said width display counter means indicative of the width of the material, and width display means receiving said final number from said width display counter means and displaying the width of the material.

3. A circuit, as set forth in claims 1 or 2, wherein the material has a first and a second edge, said third sensor means includes a plurality of light sensitive devices monitoring the position of said first and said second material edge relative to that of the longitudinal axis, each said light sensitive device providing an edge location pulse train output signal the number of pulses in which is indicative of the position of its monitored said material edge, and guiding sensor selecting means for receiving all said edge location pulse train output signals from said plurality of light sensitive devices and selecting which of said pulse train output signals is to be received by said position error counter means.

4. A circuit, as set forth in claim 3, wherein said third sensor means includes first edge sensor means and second edge sensor means, said guiding sensor selecting means providing said pulse train output signals from both said first edge and said second edge sensor means to said position error counter means, said position error counter means incrementing upon receipt of said pulse train output signal from one said edge sensor means and decrementing upon receipt of said pulse train output signal from the other said edge sensor means, said position error correction means including converter means for converting said final number into a proportional analog error signal for receipt by a drive circuit for the conveyor position drive motor.

5. A circuit, as set forth in claim 1, further including width display counter means for receiving said pulse train output signal from said third sensor means and counting from a preselected number for a count proportional to said number of pulses in said pulse train output signal, said final number in said width display counter means indicative of the width of the material, and width display means receiving said final number from said width display counter means and displaying the width of the material, the material having a first and a second edge, said sensor means including a plurality of light sensitive devices monitoring the position of said first and said second material edge relative to that of the longitudinal axis, each said light sensitive device providing an edge location pulse train output signal the number of pulses in which is indicative of the position of its monitored said material edge, and guiding sensor selecting means for receiving all said edge location pulse train output signals from said plurality of light sensitive devices and selecting which of said pulse train output signals is to be received by said position error counter means, the circuit further including width display selecting means for receiving all said edge location pulse train output signals from said plurality of light sensitive devices and selecting which of said pulse train output signals is to be received by said width display counter, multiplier means receiving the pulse train output signal selected by said width display selecting means and correlating the number of pulses therein with that in the desired unit of measurement, said width display counter receiving said correlated pulse train output signal.

6. A circuit, as set forth in claim 5, further including width display counter control means for receiving and monitoring which of said pulse train output signals is to be received by said width display counter means and periodically clearing and presetting said width display counter means.

7. A circuit, as set forth in claim 1, wherein said rate multiplier means receives said output signal from said second sensor means and generates an output signal in preselected proportion thereto, said ratio means further including combiner means for receiving said proportional output signal from said rate multiplier means and receiving said output signal from said first sensor means and providing a sequentially combined output signal, said tracking error correction means receiving said output signal from said combiner means.

8. A circuit, as set forth in claims 1 or 7, wherein said output signal from said first sensor means is a pulse train the number of pulses in which is proportional to the change in position of the material relative to the transverse reference axis and whose electrical phase relationship to a first reference pulse train is indicative of the direction of any travel of the material.

9. A circuit, as set forth in claim 8, wherein said output signal from said second sensor means is a pulse train the number of pulses in which is proportional to the change in position of the locus of points of the elastic material on the surface of the building drum and whose electrical phase relationship to a second reference pulse train is indicative of the direction of any rotation of the building drum.

10. A circuit, as set forth in claim 9, further including a plurality of direction detection means for providing a first pulse train output signal the number of pulses in which is proportional to the change in position in a first direction and for providing a second pulse train output signal the number of pulses in which is proportional to the change in position in a second direction, a first said direction detection means receiving said pulse train output signal from said first sensor means and whose output signals are proportional to the respective directional change in position of the material relative to the transverse reference axis, a second said direction detection means receiving said pulse train output signal from said second sensor means and whose output signals are proportional to the respective directional change in position of the locus of points of the elastic material on the surface of the building drum, and anticoincidence means for insuring said output signals from said plurality of direction detection means are sequentially ordered.

11. A circuit, as set forth in claim 10, wherein said rate multiplier means receives said pulse train output signals from said second direction detection means, and said combiner means receives said pulse train output signals from said first direction detection means, said tracking error correction means including counter means and converter means, said counter means for receiving said pulse train output signal from said combiner means, counting the number of pulses therein, and providing a final count, said converter means for receiving said final count and converting the same into a proportional analog error signal for receipt by a drive circuit for the conveyor drive motor.

12. A circuit, as set forth in claim 11, further including tracking lag minimizer means for reducing the position lag error and the response time of the conveyor drive motor to an analog error signal, said tracking lag minimizer means receiving said output signal from said second sensor means and providing an analog output signal in proportion to the frequency thereof to said drive circuit for the conveyor drive motor.

13. A circuit, as set forth in claim 12, wherein said tracking lag minimizer means further includes switch means receiving said pulse train output signals from said second direction detection means and switching the polarity of said analog output signal to minimize the response time of the conveyor drive motor irrespective of the direction of travel of the building drum.

14. A circuit for controlling the position of a material on a conveyor relative to a locus of points of an elastic material on the surface of a building drum having a drum rotation drive motor, the conveyor having both longitudinal and transverse reference axes and a conveyor drive motor, comprising:
   first sensor means for generating an output signal indicative of the position of the material relative to the transverse reference axis and the direction of any motion thereof;
   second sensor means for generating an output signal indicative of the position of the locus of points of the elastic material on the surface of the building drum and the direction of any rotation thereof;
   ratio means including rate multiplier means for receiving said output signals from one of said first or said second sensor means and generating an output signal in a preselected proportion thereto; and,
   tracking error correction means for receiving said output signal from said ratio means and providing an output signal to the conveyor drive motor whereby the conveyor drive motor maintains the desired position of the material relative to the transverse reference axis and the locus of points of the elastic material on the surface of the building drum.

15. A circuit, as set forth in claim 14, wherein said rate multiplier means receives said output signal from said second sensor means and generates an output signal in preselected proportion thereto, said ratio means further including combiner means for receiving said proportional output signal from said rate multiplier means and receiving said output signal from said first sensor means and providing a sequentially combined output signal, said tracking error correction means receiving said output signal from said combiner means.

16. A circuit, as set forth in claims 14 or 15, wherein said output signal from said first sensor means is a pulse train the number of pulses in which is proportional to the change in position of the material relative to the transverse reference axis and whose electrical phase relationship to a first reference pulse train is indicative of the direction of any travel of the material.

17. A circuit, as set forth in claim 16, wherein said output signal from said second sensor means is a pulse train the number of pulses in which is proportional to the change in position of the locus of points of the elastic material on the surface of the building drum and whose electrical phase relationship to a second reference pulse train is indicative of the direction of any rotation of the building drum.

18. A circuit, as set forth in claim 17, further including a plurality of direction detection means for providing a first pulse train output signal the number of pulses in which is proportional to the change in position in a first direction and for providing a second pulse train output signal the number of pulses in which is proportional to the change in position in a second direction, a first said direction detection means receiving said pulse train output signal from said first sensor means and whose output signals are proportional to the respective directional change in position of the material relative to the transverse reference axis, a second said direction detection means receiving said pulse train output signal from said second sensor means and whose output signals are proportional to the respective directional change in position of the locus of points of the elastic material on the surface of the building drum, and anticoincidence means for insuring said output signals from said plurality of direction detection means are sequentially ordered.

19. A circuit, as set forth in claim 14, wherein
said rate multiplier means receives said output signal from said second sensor means and generates an output signal in preselected proportion thereto, said ratio means further including combiner means for receiving said proportional output signal from said rate multiplier means and receiving said output signal from said first sensor means and providing a sequentially combined output signal, said tracking error correction means receiving said output signal from said combiner means, said output signal from said first sensor means is a pulse train the number of pulses in which is proportional to the change in position of the material relative to the transverse reference axis and whose electrical phase relationship to a first reference pulse train is indicative of the direction of any travel of the material, said output signal from said second sensor means is a pulse train the number of pulses in which is proportional to the change in position of the locus of points of the elastic material on the surface of the building drum and whose electrical phase relationship to a second reference pulse train is indicative of the direction of any rotation of the building drum, the circuit further includes a plurality of direction detection means for providing a first pulse train output signal the number of pulses in which is proportional to the change in position in a first direction and for providing a second pulse train output signal the number of pulses in which is proportional to the change in position in a second direction, a first said direction detection means receiving said pulse train output signal from said first sensor means and whose output signals are proportional to the respective directional change in position of the material relative to the transverse reference axis, a second said direction detection means receiving said pulse train output signal from said second sensor means and whose output signals are proportional to the respective directional change in position of the locus of points of the elastic material on the surface of the building drum, and anticoincidence means for insuring said output signals from said plurality of direction detection means are sequentially ordered, said rate multiplier means receives said pulse train output signals from said second direction detection means, and said combiner means receives said pulse train output signals from said first direction detection means, said tracking error correction means including counter means and converter means, said counter means for receiving said pulse train output signal from said combiner means, counting the number of pulses therein, and providing a final count, said converter means for receiving said final count and converting the same into a proportional analog error signal for receipt by a drive circuit for the conveyor drive motor.

20. A circuit, as set forth in claim 19, further including tracking lag minimizer means for reducing the position lag error and the response time of the conveyor drive motor to an analog error signal, said tracking lag minimizer means receiving said output signal from said second sensor means and providing an analog output signal in proportion to the frequency thereof to said drive circuit for the conveyor drive motor.

21. A circuit, as set forth in claim 20, wherein said tracking lag minimizer means further includes switch means receiving said pulse train output signals from said second direction detection means and switching the polarity of said analog output signal to minimize the response time of the conveyor drive motor irrespective of the direction of travel of the building drum.

22. A method for controlling the position of a material on a conveyor relative to a locus of points of an elastic material on the surface of a building drum having a drum rotation drive motor, the conveyor having both longitudinal and transverse reference axes, a conveyor position drive motor and conveyor drive motor, comprising the steps of:

generating a first output signal indicative of a position of the material relative to the transverse reference axis and the direction of any motion thereof;

generating a second output signal indicative of the position of the locus of points of the elastic material on the surface of the building drum and the direction of any rotation thereof;

generating a pulse train output signal having a number of pulses that is indicative of the position of the material relative to the longitudinal reference axis;

multiplying one of said first or said second output signals by a preselected ratio;

providing an output signal in proportion to said multiplied output signal to the conveyor drive motor whereby the conveyor drive motor maintains the desired position of the material relative to the transverse reference axis and the locus of points of the elastic material on the surface of the building drum;

counting in a first counter from a first preselected number for a count proportional to the number of pulses in said pulse train output signal, the final number in said first counter indicative of the necessary correction in the position of the material to maintain a preselected position relative to the longitudinal reference axis; and, generating an output signal proportional to said final number to be received by the conveyor position drive motor whereby the necessary correction to return the material to its preselected position relative to the longitudinal reference axis is achieved.

23. A method, as set forth in claim 22, further including the steps of counting in a second counter from a second preselected number for a count proportional to said number of pulses in said pulse train output signal, said final number in said second counter indicative of the width of the material, and displaying the width of the material.

24. A method, as set forth in claims 22 or 23, wherein the material has a first and a second edge, and said step of generating a pulse train output signal includes the steps of monitoring the position of said first and said second edge relative to that of the longitudinal axis, generating for each edge an edge location pulse train output signal having a number of pulses that is indicative of the position of the respective material edge, and selecting which of said edge location pulse train output signals is used to establish said count during said step of counting from a first preselected number.

25. A method, as set forth in claim 24, wherein said step of counting in a first counter from a first preselected number includes the step of counting upwardly upon receipt of one of said edge location pulse train output signals and counting downwardly upon receipt of the other of said edge location pulse train output signals, and further including the step of converting said final number into a proportional analog error signal for receipt by a drive circuit for the conveyor position drive motor.

26. A method, as set forth in claim 22, further including the steps of
counting in a second counter from a second preselected number for a count proportional to said number of pulses in said pulse train output signal, said final number in said second counter indicative of the width of the material, and displaying the width of the material, the material having a first and a second edge, said step of generating a pulse train output signal including the steps of monitoring the position of said first and said second edge relative to that of the longitudinal axis, generating for each edge an edge location pulse train output signal having a number of pulses that is indicative of the position of the respective material edge, and selecting which of said edge location pulse train output signals is used to establish said count during said step of counting from a first preselected number, said step of counting in a first counter from a first preselected number including the step of counting upwardly upon receipt of one of said edge location pulse train output signals and counting downwardly upon receipt of the other of said edge location pulse train output signals,
converting said final number into a proportional analog error signal for receipt by a drive circuit for the conveyor position drive motor, and,
selecting which of said edge location pulse train output signals is used to establish said count during said step of counting in a second counter from a second preselected number, correlating the number of pulses in said selected edge location pulse train output signal with that in the desired unit of measurement, said step of counting in a second counter from a second preselected number counting said correlated number of pulses in said selected edge location pulse train output signal.

27. A method, as set forth in claim 26, further including the step of monitoring which of said edge location pulse train output signals is selected to establish said count during said step of counting in a second counter from a second preselected number, and clearing and presetting said second counter.

28. A method, as set forth in claim 22, wherein said step of multiplying one of said first or said second output signals by a preselected ratio comprises the step of multiplying said second output signal by said preselected ratio, and further including the step of generating a sequentially combined output signal from said first output signal and said multiplied second output signal.

29. A method, as set forth in claims 22 or 28, wherein said generated first output signal is a pulse train the number of pulses in which is proportional to the change in position of the material relative to the transverse reference axis, and whose electrical phase relationship to a first reference pulse train is indicative of the direction of any travel of the material.

30. A method, as set forth in claim 29, wherein said generated second output signal is a pulse train the number of pulses in which is proportional to the change in position of the locus of points of the elastic material on the surface of the building drum, and whose electrical phase relationship to a second reference pulse train is indicative of any direction of rotation of the building drum.

31. A method, as set forth in claim 30, further including the steps of
detecting from said generated first output signal the direction of a change in position of the material relative to the transverse reference axis, and generating first and second directional pulse train output signals the number of pulses in which are proportional to said change in position in the respective direction,
detecting from said generated second output signal the direction of a change in position of the locus of points of the elastic material on the surface of the building drum, and generating third and fourth directional pulse train output signals the number of pulses in which are proportional to said change in position in the respective direction, and,
sequentially ordering the generation of said first, second, third and fourth directional pulse train output signals so that no output pulse coincides with the output of any other pulse.

32. A method, as set forth in claim 22, wherein said step of multiplying one of said first or said second output signals by a preselected ratio includes the step of multiplying said second output signal by said preselected ratio, and further including the steps of
generating a sequentially combined output signal from said first output signal and said multiplied second output signal, said generated first output signal is a pulse train the number of pulses in which is proportional to the change in position of the material relative to the transverse reference axis and whose electrical phase relationship to a first reference pulse train is indicative of the direction of any travel of the material, said generated second output signal is a pulse train the number of pulses in which is proportional to the change in position of the locus of points of the elastic material on the surface of the building drum and whose electrical phase relationship to a second reference pulse train is indicative of any direction of rotation of the building drum, said sequentially combined output signal thereby including a number of pulses,
detecting from said generated first output signal the direction of a change in position of the material relative to the transverse reference axis, and generating first and second directional pulse train output signals the number of pulses in which are proportional to said change in position in the respective direction, detecting from said generated second output signal the direction of a change in position of the locus of points of the elastic material on the surface of the building drum, and generating third and fourth directional pulse train output signals the number of pulses in which are proportional to said change in position in the respective direction, sequentially ordering the generation of said first, second, third and fourth directional pulse train output signals so that no output pulse coincides with the output of any other pulse, and, counting in a difference counter the number of pulses in said sequentially combined output signal, said difference counter arriving at a final count, said step of providing an output signal including the step of converting said final count in said difference counter into a proportional analog error signal for receipt by a drive circuit for the conveyor drive motor.

33. A method, as set forth in claim 32, further including the step of minimizing the position lag error and the response time of the conveyor drive motor to said analog error signal, said step of minimizing including the step of providing to said drive circuit for the conveyor drive motor an analog output signal in proportion to the frequency of said generated second output signal.

34. A method, as set forth in claim 33, wherein said step of minimizing further includes the step of switching the polarity of said analog output signal to minimize the position lag error and the response time of the conveyor drive motor irrespective of the direction of travel of the building drum.

35. A method for controlling the position of a material on a conveyor relative to a locus of points of an elastic material on the surface of a building drum having a drum rotation drive motor, the conveyor having both longitudinal and transverse reference axes and a conveyor drive motor, comprising the steps of:

generating a first output signal indicative of the position of the material relative to the transverse reference axis and the direction of any motion thereof;

generating a second output signal indicative of the position of the locus of points of the elastic material on the surface of the building drum and the direction of any rotation thereof;

multiplying one of said first or said second output signals by a preselected ratio; and, providing an output signal in proportion to said multiplied output signal to the conveyor drive motor whereby the conveyor drive motor maintains the desired position of the material relative to the transverse reference axis and the locus of points of the elastic material on the surface of the building drum.

36. A method, as set forth in claim 35, wherein said step of multiplying one of said first or said second output signals by a preselected ratio comprises the step of multiplying said second output signal by said preselected ratio, and further including the step of generating a sequentially combined output signal from said first output signal and said multiplied second output signal.

37. A method, as set forth in claims 35 or 36, wherein said generated first output signal is a pulse train the number of pulses in which is proportional to the change in position of the material relative to the transverse reference axis, and whose electrical phase relationship to a first reference pulse train is indicative of the direction of any travel of the material.

38. A method, as set forth in claim 37, wherein said generated second output signal is a pulse train the number of pulses in which is proportional to the change in position of the locus of points of the elastic material on the surface of the building drum, and whose electrical phase relationship to a second reference pulse train is indicative of any direction of rotation of the building drum.

39. A method, as set forth in claim 38, further including the steps of detecting from said generated first output signal the direction of a change in position of the material relative to the transverse reference axis, and generating first and second directional pulse train output signals the number of pulses in which are proportional to said change in position in the respective direction, detecting from said generated second output signal the direction of a change in position of the locus of points of the elastic material on the surface of the building drum, and generating third and fourth directional pulse train output signals the number of pulses in which are proportional to said change in position in the respective direction, and, sequentially ordering the generation of said first, second, third, and fourth directional pulse train output signals so that no output pulse coincides with the output of any other pulse.

40. A method, as set forth in claim 34, wherein said step of multiplying one of said first or said second output signals by a preselected ratio includes the step of multiplying said second output signal by said preselected ratio, and further including the step of generating a sequentially combined output signal from said first output signal and said multiplied second output signal, said generated first output signal is a pulse train the number of pulses in which is proportional to the change in position of the material relative to the transverse reference axis and whose electrical phase relationship to a first reference pulse train is indicative of the direction of any travel of the material, said generated second output signal is a pulse train the number of pulses in which is proportional to the change in position of the locus of points of the elastic material on the surface of the building drum and whose electrical phase relationship to a second reference pulse train is indicative of any direction of rotation of the building drum, the method further including the steps of detecting from said generated first output signal the direction of a change in position of the material relative to the transverse reference axis, and generating first and second directional pulse train output signals the number of pulses in which are proportional to said change in position in the respective direction, detecting from said generated second output signal the direction of a change in position of the locus of points of the elastic material on the surface of the building drum, and generating third and fourth directional pulse train output signals the number of pulses in which are proportional to said change in position in the respective direction, sequentially ordering the generation of said first, second, third and fourth directional pulse train output signals so that no output pulse coincides with the output of any other pulse, and, counting in a difference counter the number of pulses in said sequentially combined output signal, said difference counter arriving at a final count, said step of providing an output signal including the step of converting said final count in said difference counter into a proportional analog error signal for receipt by a drive circuit for the conveyor drive motor.

41. A method, as set forth in claim 40, further including the step of minimizing the position lag error and the response time of the conveyor drive motor to said analog error signal, said step of minimizing including the step of providing to said drive circuit for the conveyor drive motor an analog output signal in proportion to the frequency of said generated second output signal.

42. A method, as set forth in claim 41, wherein said step of minimizing further includes the step of switching the polarity of said analog output signal to minimize the position lag error and the response time of the conveyor drive motor irrespective of the direction of travel of the building drum.

* * * * *